UNITED STATES PATENT OFFICE.

CARL BÜLOW, OF LUDWIGSHAFEN, GERMANY, ASSIGNOR TO THE BADISCHE ANILIN AND SODA FABRIK, OF SAME PLACE.

BLACK DISAZO DYE.

SPECIFICATION forming part of Letters Patent No. 524,665, dated August 14, 1894.

Application filed June 15, 1893. Serial No. 477,708. (Specimens.) Patented in Germany April 24, 1891, No. 71,199; in England May 4, 1891, No. 7,713; in France May 4, 1891, No. 213,232, and in Russia March 24, 1893, No. 3,586.

*To all whom it may concern:*

Be it known that I, CARL BÜLOW, doctor of philosophy, a subject of the Grand Duke of Mecklenburg-Schwerin, residing at Ludwigshafen-on-the-Rhine, in the Kingdom of Bavaria and Empire of Germany, have invented new and useful Improvements in Black Disazo Dyes, (for which patents have been obtained in the following countries: England, No. 7,713, dated May 4, 1891; France, No. 213,232, dated May 4, 1891; Russia, No. 3,586, dated March 24, 1893, and Germany, No. 71,199, dated April 24, 1891,) of which the following is a specification.

My invention relates to a new class of black dyestuffs suited for dyeing wool or other animal fiber. The said dyes are chemically disazo-compounds derived from the 1.8 amido-naphthol-mono-sulfoacid, described in the English Letters Patent No. 9,676 of 1890 by the combination therewith of two molecular proportions of certain diazo-compounds.

The diazo-compounds which I find best suited for use for the preparation of my new black dyes are those obtainable from para-toluidin, anilin, alpha-naphthyl-amin and sulfanilic acid. In the manufacture of the black, either one molecular proportion of one diazo-compound and one molecular proportion of another can be combined with the afore-mentioned 1.8 amido-naphthol-mono-sulfoacid or two molecular proportions of the same diazo-compound can be so used. In this way several closely related bodies are obtained which possess the same generic properties, though they differ slightly from one another in various respects.

In the present application for Letters Patent I propose to claim generically the new class of dyes herein defined and also the specific dye obtained by the use of first, one molecular proportion of the diazo-compound from sulfanilic acid and subsequently one molecular proportion of the diazo-compound from anilin and save in so far as they are protected by the generic claim I make no claim in this application to the other specific dyes herein described.

The following example will serve to illustrate the manner in which my invention can be carried into practical effect and the new black obtained. The parts are by weight.

Example: Dissolve about two hundred (200) parts of 1.8 amido-naphthol-mono-sulfoacid in about six thousand (6,000) parts of boiling water adding about two hundred and twenty-five (225) parts of crystallized sodium acetate. Cool the solution while stirring continuously, so that the crystalline precipitate which forms shall be as finely divided as possible. Next add about six thousand (6,000) parts of ice and run in a solution of the diazo-compound obtained in the usual way from about one hundred and seventy-four (174) parts of sodium sulfanilate (containing one molecule water of crystallization) by treatment with three hundred and fifty (350) parts of hydrochloric acid containing about thirty per cent. real acid (30% HCl) and about fifty-seven (57) parts of sodium nitrite, using of course the requisite quantities of water and ice. Stir for about twelve hours when the formation of the mono-azo-dye will be complete. To the solution of this intermediate body so obtained add about eight hundred (800) parts of calcined soda and then the diazo-compound obtained from about seventy-seven (77) parts of anilin, about three hundred (300) parts of hydrochloric acid containing about thirty per cent. real acid (30% HCl), about one thousand five hundred (1,500) parts of water, about one thousand five hundred (1,500) parts of ice, and about fifty-seven (57) parts of sodium nitrite. Stir for about twelve hours, boil and add common salt to precipitate the disazo-dye, filter hot, press and dry.

In an analogous manner a new black dye can be obtained by first combining one molecular proportion of 1.8 amido-naphthol-sulfoacid with one molecular proportion of the diazo-compound derived from alpha-naphthylamin and subsequently with one molecular proportion of the diazo-compound derived from sulfanilic acid. Similarly also the 1.8 amido-naphthol-mono-sulfoacid can be combined with two molecular proportions of the diazo-compounds from anilin, para-toluidin and alpha-naphthylamin or in these cases the procedure can if desired be simplified by adding the whole quantity of diazo-compounds at once and effecting the combination in alkaline solution throughout.

In preparing my new black a large number of other diazo-compounds can be used but the best results are obtained by using those hereinbefore mentioned and in the specific manner described. My new black however prepared possesses the following generic properties: It occurs as a dark powder with a slight bronze-like sheen, it is soluble in hot water giving deep blackish-blue solutions, which turn a beautiful pure blue to violet color on adding a caustic alkaline solution. On treatment with a diazo-compound such as diazo-benzene-sulfo-acid in a solution rendered alkaline with soda, my new black is destroyed; this is a characteristic property and must be taken into consideration in manufacturing, for the presence of an excess of diazo-compound causes loss or destruction of the product desired.

The specific dyestuff obtained by the use of first, the diazo-compound from sulfanilic acid in acetic acid solution, and secondly, the diazo-compound from anilin in alkaline solution as described in the example, is characterized by the following properties: It possesses all the generic properties hereinbefore described and is further characterized by being readily soluble in cold as well as in hot water giving a blackish blue solution which turns to a purer blue on adding soda solution or caustic soda. This change can best be seen by pouring the solution on to filter paper. It also yields a green solution in pure concentrated sulfuric acid which becomes discolored in the presence of nitrous acid.

My new dye in its commercial condition is liable to contain traces of the corresponding mono-azo-compound as impurity, but this does not interfere with its use in any way, and I make no claim to the said mono-azo-bodies.

What I claim as new, and desire to secure by Letters Patent, is—

1. The new black dyes being chemically the dis-azo-compounds of 1.8 amido-naphthol-mono-sulfo-acid hereinbefore defined, which can be obtained by the combination of two molecular proportions of a di-azo compound with one molecular proportion of the aforesaid sulfo-acid in the manner herein set forth, and which are soluble in hot water giving blackish-blue solutions, which are changed in color to a beautiful pure blue to violet on the addition of a caustic alkali, and which are destroyed by treatment with di-azo-benzene-sulfo-acid in alkaline solution all substantially as hereinbefore described.

2. The specific black dye being chemically a dis-azo compound from sulfanilic acid, anilin, and the 1.8 amido-naphthol-mono-sulfo-acid hereinbefore defined, which can be obtained as hereinbefore set forth in the example, and which is a dark powder readily soluble in cold and hot water giving a blackish-blue solution which turns to a purer blue on addition of alkali and which dye yields a green solution in sulfuric acid becoming discolored by nitrous acid.

In testimony whereof I have hereunto set my hand in the presence of two subscribing witnesses.

CARL BÜLOW.

Witnesses:
ERNEST F. EHRHARDT,
ADOLPH REUTLINGER.